United States Patent
Ackermann

(10) Patent No.: US 7,681,699 B2
(45) Date of Patent: Mar. 23, 2010

(54) SELF-PUMPING HYDROPNEUMATIC VIBRATION DAMPER

(75) Inventor: Norbert Ackermann, Eitorf (DE)

(73) Assignee: ZF Friedrichshafen AG, Friedrichshafen (DE)

(*) Notice: Subject to any disclaimer, the term of this patent is extended or adjusted under 35 U.S.C. 154(b) by 666 days.

(21) Appl. No.: 11/368,956

(22) Filed: Mar. 6, 2006

(65) Prior Publication Data

US 2006/0197268 A1  Sep. 7, 2006

(30) Foreign Application Priority Data

Mar. 5, 2005 (DE) .................... 10 2005 010 240

(51) Int. Cl.
*F16F 9/34* (2006.01)
(52) U.S. Cl. .................. 188/322.15; 188/289
(58) Field of Classification Search ........... 188/322.15, 188/322.22, 283, 289, 304, 314–317
See application file for complete search history.

(56) References Cited

U.S. PATENT DOCUMENTS 4,874,066 A * 10/1989 Silberstein ............. 188/280
5,826,863 A   10/1998 Beck
6,651,547 B2  11/2003 Knecht et al.
2002/0121416 A1* 9/2002 Katayama et al. ........... 188/314
2004/0231935 A1 11/2004 Asadi et al.

FOREIGN PATENT DOCUMENTS

GB  2196092 A * 4/1988

* cited by examiner

*Primary Examiner*—Xuan Lan Nguyen
(74) *Attorney, Agent, or Firm*—Cohen Pontani Lieberman & Pavane LLP

(57) ABSTRACT

A self-pumping hydropneumatic vibration damper with internal level control, especially for motor vehicles, has an oil-filled working cylinder under the pressure of at least one gas cushion. The working cylinder is divided into two working spaces by a working piston mounted on a piston rod. A piston pump, which is driven by the sprung movements of the vehicle and thus conveys damping oil from a low-pressure chamber into the working space connected to the high-pressure chamber. The pump cylinder of this piston pump is formed by the hollow piston rod, which connects the working space connected to the high-pressure chamber to the low-pressure chamber. An axially movable stepped pump piston is provided in the pump cylinder.

14 Claims, 2 Drawing Sheets

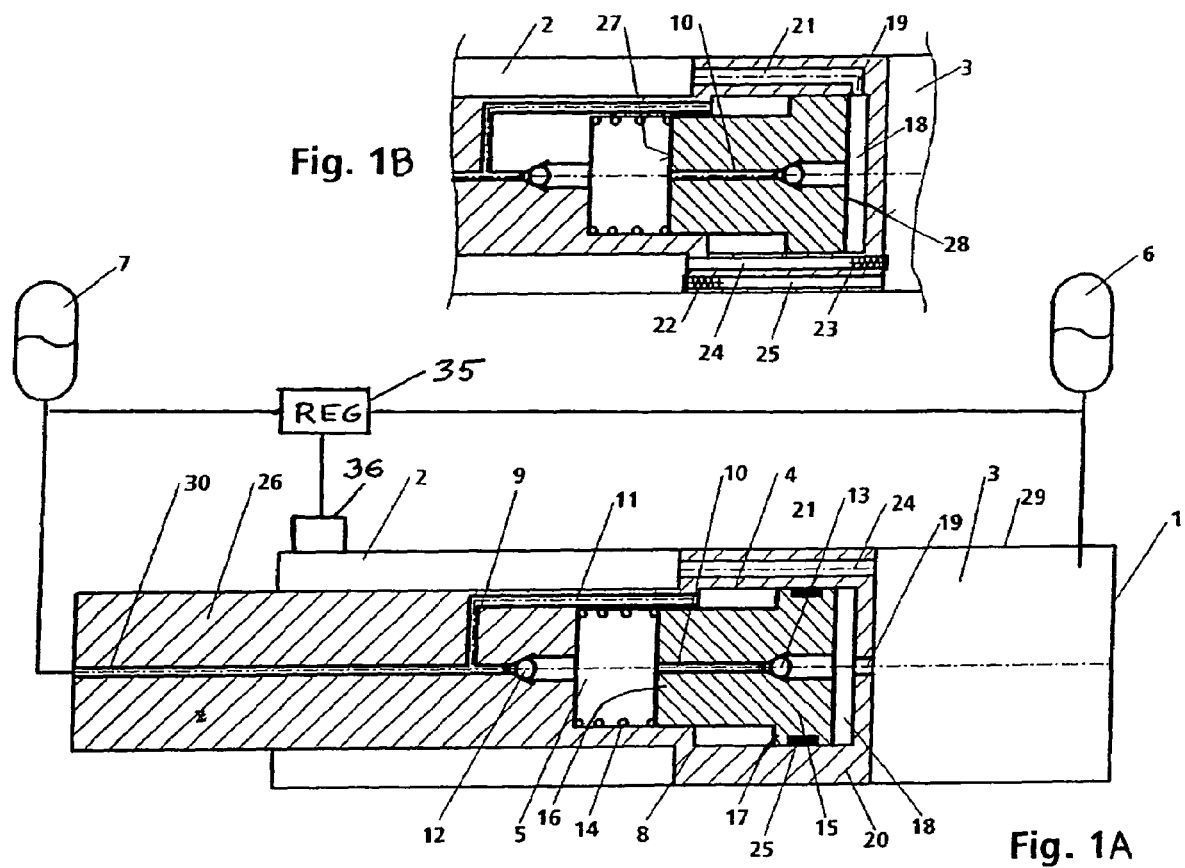
Fig. 1B
Fig. 1A
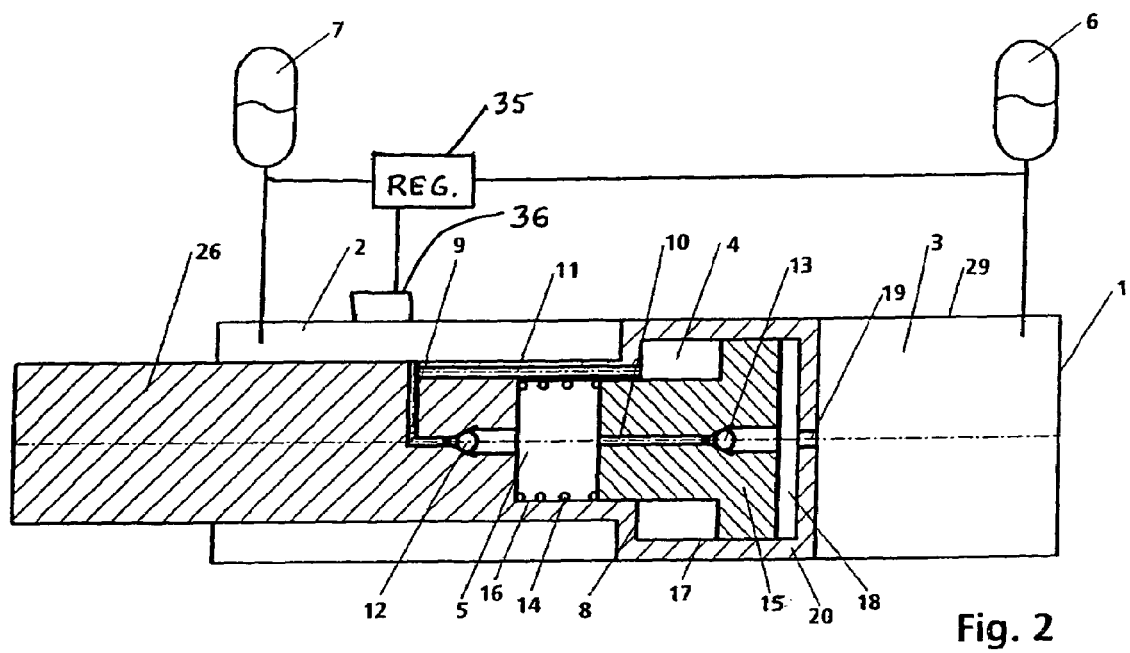
Fig. 2

SELF-PUMPING HYDROPNEUMATIC VIBRATION DAMPER

BACKGROUND OF THE INVENTION

1. Field of the Invention

The invention relates to a self-pumping hydropneumatic vibration damper with level control, especially for motor vehicles. The vibration damper includes a damping oil-filled working cylinder under the pressure of at least one gas cushion, which is located in a high-pressure chamber and acts as a spring, the working cylinder being divided into two working spaces by a working piston mounted on a piston rod; and a piston pump driven by sprung movements of the vehicle to convey damping oil from a low-pressure chamber into the working space connected to the high-pressure chamber.

2. Description of the Related Art

Self-pumping hydropneumatic vibration dampers with internal level control are already known (e.g., U.S. Pat. Nos. 5,826,863 and 6,651,547), in which the working piston divides the working cylinder into two working spaces and in which the piston rod and a pump rod together form a pump cylinder, which conveys oil from a low-pressure chamber to the working space connected to the high-pressure chamber under the action of the sprung movements caused by irregularities in the pavement. Depending on the position of the working piston in the working cylinder, a regulating opening connects the high-pressure chamber to the low-pressure chamber and thus, when the vehicle is unloaded, the vehicle body returns to its normal level again. With this type of vibration damper, however, the piston pump requires both a hollow piston rod and a pump rod.

SUMMARY OF THE INVENTION

An object of the invention is to create a self-pumping hydropneumatic vibration damper in which a satisfactory pump output can be produced for the automatic regulation of the vehicle body but where, at the same time, the use of a pump rod can be eliminated.

According to the invention, an axially movable pump piston designed as a stepped piston is provided, where the pressure of the first reservoir can act on the end surface with the larger diameter.

It is advantageous here that, when the piston rod travels into the working cylinder of the vibration damper, a change in the pressure in the high-pressure chamber is produced in correspondence with the volume of the inward-traveled section of the piston rod and with the spring characteristic of the gas cushion. While the piston rod is traveling into the working cylinder, furthermore, damping forces and thus pressure differences between the working spaces are also produced in correspondence with the speed of the inward travel and the preset damping force characteristic. These pressure differences can be used if desired to drive the pump piston in the hollow piston rod in order to convey damping medium into the lower-pressure working space, so that the piston rod will be pushed outward until it reaches a certain level at which a release device reacts.

According to an essential feature, at least one flow connection is provided to connect the two working spaces to each other. It is advantageous here to provide at least one nonreturn valve in the flow connection.

According to an especially favorable embodiment, either the flow connection passes through the pump piston or the flow connection passes through the housing.

According to an embodiment which is favorable with respect to its technical function, the stepped piston can take advantage of the different sizes of the two end surfaces of the piston pump to produce pump work when the pressures at these two surfaces are equal.

According to another embodiment, the pressure of the second working space acts on the two end surfaces of the pump piston directly or indirectly during the compression stage.

According to another favorable embodiment, the pump space formed between the rear end surface of the pump piston and the hollow piston rod is connected by a connection to the first working space.

According to an especially favorable embodiment, the connection passes through the piston rod.

According to another essential feature, the space formed between the two outside diameters of the stepped piston and the cylindrical inside wall of the housing is provided with a pressure-relief connection.

A release device is also provided. This release device can be, for example, a distance-dependent, pressure-dependent, and/or load-dependent device. It is advantageous for the release device to be actuated as a function of distance.

According to a favorable embodiment, the pump cylinder, the pump piston, and the nonreturn valves form a pump.

It is also provided that the housing and the pump piston can be located outside the working cylinder. It is advantageous in this case that the component serving as the regulating device can be located anywhere outside the vibration damper.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1A shows a partial schematic diagram of an embodiment of a vibration damper;

FIG. 1B shows the pump piston according to FIG. 1 by itself;

FIG. 2 shows another partial schematic diagram of another embodiment of the vibration damper.

DETAILED DESCRIPTION OF THE PRESENTLY PREFERRED EMBODIMENTS

Figure 3:
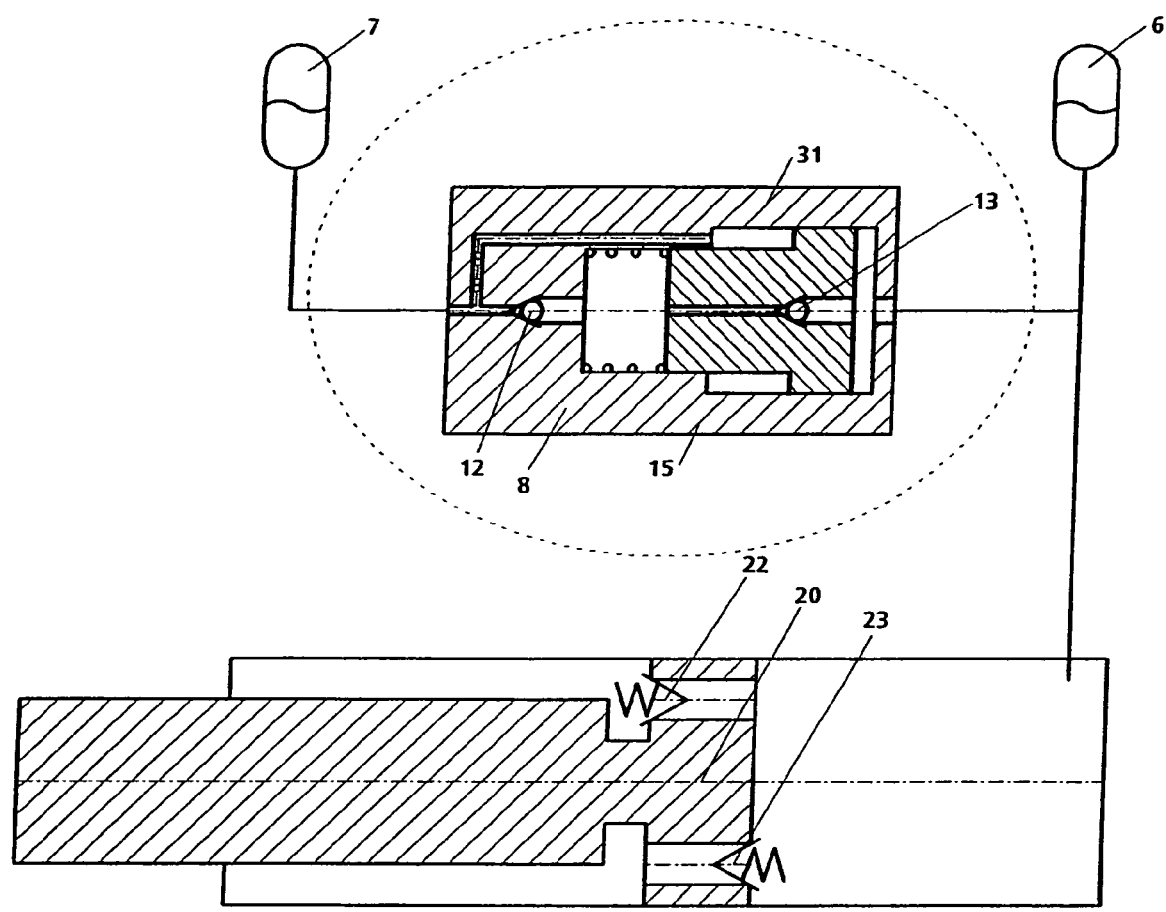
FIG. 3 is a partial schematic diagram of yet another embodiment of the vibration damper.

The self-pumping hydropneumatic vibration damper 1 shown in FIG. 1 includes a working cylinder 29, in the interior of which a working piston 20, mounted on a piston rod 26, divides the working cylinder 29 into a first working space 2 and a second working space 3. The first working space 2 is connected to a damping oil reservoir 7, and the second working space 3 is connected to a first/additional a damping oil reservoir 6. The figure is in the form of a schematic diagram, and thus the reservoirs 6 and 7 could easily be located inside the vibration damper 1, as is known from the prior art.

Inside the working piston 20 there is an annular space 4, in the interior of which a pump piston 15 is mounted with freedom of axial movement. The pump piston 15 has a first section 16 with a first diameter 16 and a secondary section 17 with a second diameter which is larger than the first diameter. The actual pump cylinder 5 itself is formed between the rear end surface 27 of the pump piston 15 and the bottom of the annular space 4. Inside the pump cylinder 5, a spring element 14 is provided to exert force on the rear end surface 27 of the pump piston 15. Proceeding from the pump cylinder 5 by way of a first nonreturn valve 12, a flow connection 30 passes to the second reservoir 7. To relieve the pressure, a pressure-relief connection 11 passes from the space 4 via a transverse connection 9 to the flow connection 30 and thus also to the second reservoir 7. The flow connections 9, 10, 11 and the nonreturn valve 12 could also be connected in such a way that the annular space 4 becomes the pump space and the cylindrical space 5 becomes the pressure-relieved space. They can therefore exchange functions with each other. When the working piston 20 travels into the working cylinder 29, the working piston 20 moves axially toward the second working space 3 and thus produces a change in the pressure between the first reservoir 6 and the second reservoir 7.

According to FIG. 1B, the working piston 20 is provided with flow connections 24 and 25, each of which has a damping element 22, 23, so that a damping force is produced when the working piston 20 moves axially in the working cylinder 29.

The first working space 2, furthermore, is connected by a flow connection 19 to the chamber 18. The flow connection 10 passing from the forward end surface 28 to the rear end surface 27 is equipped with a second nonreturn valve 13. To produce the damping force, a flow connection 24 is provided in FIG. 1A; this connection functions in the same way as that as illustrated in FIG. 1B. Corresponding damping elements 22, 23 can also be used here.

In FIG. 1B, the chamber 18 also receives flow through the flow connection 19, but it comes from the first working space 2 and not, as in the case of FIG. 1, from the second working space 3. The way in which the two principles operate, however, is the same. If desired, the pump piston 15 can have a sealing element 25 on its larger diameter 17 to seal off the chamber 18 from the space 4.

Simply as a result of the velocity of the working piston 20 during the tension stage, damping forces which correspond to the pressure differences between the first working space 2 and the second working space 3 are produced. These pressure differences are used to move the pump piston 15 axially in its space 4 and thus, when the pressure increases in the pump cylinder 5, to convey damping medium via the flow connection 10 and through the nonreturn valve 13, the chamber 18, and the flow connection 19 to the second working space 3 (FIG. 1A). The first reservoir 6 and the second working space 3 are thus precompressed simultaneously, with the result that the working piston 20 is pushed outward from the working cylinder 29.

As soon as the working piston 20 reaches a certain point in the working cylinder 29, a conventional release device 35 goes into operation. A regulating device of this type can be in the form of a distance-dependent and/or pressure-dependent and/or load-dependent device, which can be sensed electrically or mechanically as desired, so that any further outward travel of the working piston 20 in the working cylinder 29 is prevented.

The device according to FIGS. 1 and 2 functions in the following way. When the working piston 20 is not moving, the pump piston 15 is in a state of equilibrium with respect to the forces in the first working space 2 and the second working space 3. When the piston rod 26 travels axially inward into the working cylinder 29, however, the damping medium in the second working space 3 is conveyed into the first reservoir 6 and leads there to an increase ΔP in the system pressure. According to the formula, the displaced volume ΔV in the first reservoir 6 causes a change ΔP in the pressure. This is achieved by the force ΔP×(large Ø 17—small Ø 16), and as a result the pump piston 15 is pushed against the spring element 14. As the pump piston 15 moves away, the nonreturn valve 13 opens and allows damping medium to pass from the pump cylinder 5 via the nonreturn valve 13 to the second working space 3.

In the reverse direction according to FIGS. 1 and 2, that is, when the working piston 20 is traveling out of the working cylinder 29, the damping medium is conveyed from the first working space 2, i.e., from the second reservoir 7, via the connection 9, and past the first nonreturn valve 12, to the pump cylinder 5.

At a predetermined point, that is, when the working piston 20 reaches a certain level, the regulating device 35, in response to a signal from position sensor 36, goes into operation to keep the vehicle body at this level with respect to the surface of the road or, if the vehicle has been unloaded, to bring the working piston or the pump piston 15 back into the original position.

FIG. 3 shows another embodiment, in which a housing 8 to hold the pump piston 15 is provided between the first reservoir 6 and the second reservoir 7. The pump unit, including the housing 8, the pump piston 15, and the nonreturn valves 12 and 13, is installed outside the vibration damper 1.

The connections between the reservoirs 6 and 7, the pump unit 31, and the vibration damper 1 are established by appropriate hydraulic lines. The damping valves 22, 23 are provided on the piston 20 and/or in the hydraulic line 36.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self pumping hydropneumatic vibration damper with level control comprising:
   a working cylinder filled with damping oil;
   a working piston mounted on a piston rod and dividing the working cylinder into first and second working spaces;
   a first reservoir connected to the second working space and containing a gas spring which creates pressure in the damping oil;
   a second reservoir;
   a piston pump comprising a housing and a stepped piston which is driven by reciprocal movements of the working piston in the working cylinder to pump damping oil from the second reservoir to the second working space, the stepped piston having a first section with a first diameter and a first end surface, and a second section with a second diameter and a second end surface, wherein the second diameter is larger than the first diameter, and the second end surface is exposed to pressure in the second working space; and a regulating device which is configured to release damping oil from the first reservoir to the second reservoir.

2. The vibration damper of claim 1 further comprising a flow connection connecting the working spaces.

3. The vibration damper of claim 2 wherein the housing is located in the working piston, the flow connection passing through the pump piston.

4. The vibration damper of claim 2 wherein the flow connection passes through the housing.

5. The vibration damper of claim 2 further comprising at least one non-return valve in the flow connection.

6. The vibration damper of claim 1 wherein, when the working piston moves toward the second working space, the pressure in the second working space acts on both end surfaces of the pump piston.

7. The vibration damper of claim 1 further comprising:
a pump space between the first end surface and the piston rod; and
a connection connecting the pump space to the first working space.

8. The vibration damper of claim 7 wherein the connection passes through the piston rod.

9. The vibration damper of claim 7 wherein the housing has a cylindrical inside wall, the piston pump having an annular space between the first section of the pump piston and the cylindrical inside wall, and a pressure relief connection connected to the annular space.

10. The vibration damper of claim 7 wherein the piston pump further comprises a first non-return valve between the pump space and the connection, and a second non-return valve between the pump space and the second working space.

11. The vibration damper of claim 1 wherein the regulating device releases damping oil in response to at least one of displacement, pressure, and load.

12. The vibration damper of claim 11 wherein the regulating device releases damping oil in response to displacement of the piston.

13. The vibration damper of claim 1 wherein the housing and the pump piston are located inside the working cylinder.

14. The vibration damper of claim 1 wherein the regulating device releases damping oil from the first reservoir to the second reservoir when a desired extension of the vibration damper is reached to limit an extension of the vibration damper caused by the piston pump.

* * * * *